United States Patent [19]

Dunn

[11] Patent Number: 4,750,473

[45] Date of Patent: Jun. 14, 1988

[54] LIGHT CONTROLLING HEAT COLLECTING SOLAR ROOF

[75] Inventor: Mervin E. Dunn, Annangrove, Australia

[73] Assignee: Ritelite Pty. Ltd., New South Wales, Australia

[21] Appl. No.: 917,307

[22] Filed: Oct. 10, 1986

Related U.S. Application Data

[63] Continuation of Ser. No. 694,150, Jan. 23, 1985, abandoned.

[51] Int. Cl.[4] .............................................. F29J 3/02
[52] U.S. Cl. ...................................... 126/417; 126/431; 126/450; 126/DIG. 2; 52/528; 350/258
[58] Field of Search .................... 52/18, 80, 528, 530, 52/90; 126/431, 449, 450, 438, 417, 452, DIG. 2; 350/258

[56] References Cited

U.S. PATENT DOCUMENTS

| | | | |
|---|---|---|---|
| 2,290,195 | 7/1942 | MacMillan | 52/18 |
| 3,492,765 | 2/1970 | Behlen | 52/18 |
| 4,020,989 | 5/1977 | Kautz | 126/431 |
| 4,143,492 | 3/1979 | Dunn | 52/18 |
| 4,197,834 | 4/1980 | Nevins | 126/452 |
| 4,237,861 | 12/1980 | Fayard et al. | 126/DIG. 2 |
| 4,238,912 | 12/1980 | MacDonald | 52/530 |
| 4,296,733 | 10/1981 | Saunders | 126/431 |
| 4,296,736 | 10/1981 | Soot | 126/450 |
| 4,309,988 | 1/1982 | Riley | 126/431 |
| 4,319,437 | 3/1982 | Murphy | 126/DIG. 2 |
| 4,336,793 | 6/1982 | Ahearn et al. | 126/450 |
| 4,344,413 | 8/1982 | Watkin et al. | 126/431 |
| 4,380,996 | 4/1983 | Mengeringhaven | 126/450 |
| 4,446,852 | 5/1984 | Steigelmann | 126/450 |
| 4,470,406 | 9/1984 | RinKlake | 126/450 |
| 4,498,455 | 2/1985 | Gramm | 126/450 |
| 4,505,084 | 3/1985 | Knudson | 52/528 |
| 4,509,502 | 4/1985 | Youcha | 126/449 |
| 4,534,336 | 8/1985 | Ladriere | 126/431 |
| 4,580,384 | 4/1986 | Hutcheson | 52/528 |

FOREIGN PATENT DOCUMENTS

| | | | |
|---|---|---|---|
| 61386/73 | 10/1972 | Australia . | |
| 516962 | 8/1977 | Australia . | |
| 1095359 | 2/1981 | Canada . | |
| 667759 | 10/1938 | Fed. Rep. of Germany | 350/258 |
| 3006196 | 8/1981 | Fed. Rep. of Germany | 126/DIG. 2 |
| 1212018 | 3/1960 | France | 350/258 |
| 1302594 | 7/1962 | France | 52/18 |
| 0071760 | 6/1981 | Japan | 126/431 |
| 0150756 | 9/1982 | Japan | 126/DIG. 2 |
| 0172141 | 10/1982 | Japan | 126/DIG. 2 |
| 29657 | of 1898 | United Kingdom | 350/258 |

Primary Examiner—Samuel Scott
Assistant Examiner—H. A. Odar
Attorney, Agent, or Firm—Cushman, Darby & Cushman

[57] ABSTRACT

A light controlling heat collecting solar roof, the roof being formed of sheeting material of generally corrugated form, each corrugation having a generally planar upper surface with a generally planar lower surface at the bottom of the trough, the side walls connecting the upper and lower surfaces being transparent or translucent and one of these being generally vertical and facing the equator. Heat collecting tubes may be mounted on one or both of the generally planar surfaces.

10 Claims, 5 Drawing Sheets

LIGHT CONTROLLING HEAT COLLECTING SOLAR ROOF

This is a continuation of application Ser. No. 694,150, filed Jan. 23, 1985, which was abandoned upon the filling hereof.

This invention relates to a solar roof, more particularly a roof which can be used for glass houses, outdoor entertainment areas, swimming pool enclosures, and any other area where it is desired to control the light and/or heat passing through a roof.

In my earlier Pat. Nos. 482027, 511075 and U.S. Pat. No. 4,143,492, there is described a roofing material and building such as a glass house or the like in which the direct light and heat entering the building from the sun's rays is automatically controlled during the summer and winter months.

The object of this invention is to provide a further improvement in a light controlling and heat collecting solar roof.

Thus there is provided according to the invention a light controlling solar roof in which the surface of the roof is formed of a sheeting material of generally corrugated form, with the corrugations being of an angular configuration, each corrugation having a generally planar upper surface and a generally planar surface forming the bottom of the trough, the upper surface and/or the lower surface each having means to prevent the passage of the sun's rays therethrough with the surfaces joining the upper and lower surfaces transparent or translucent, at least a corresponding one of these joining surfaces of each corrugation being vertical or near vertical and facing the equator to allow a greater amount of light transmission therethrough at the winter solstice than at the summer solstice.

According to a further feature of the invention the upper planar surface can carry solar heat collecting tubes for heating a medium flowing through the tubes.

In a further feature of the invention the lower planar surface can carry solar heat collecting tubes.

In order to more fully describe the invention reference is now made to the accompanying drawings in which.

Figure 1:
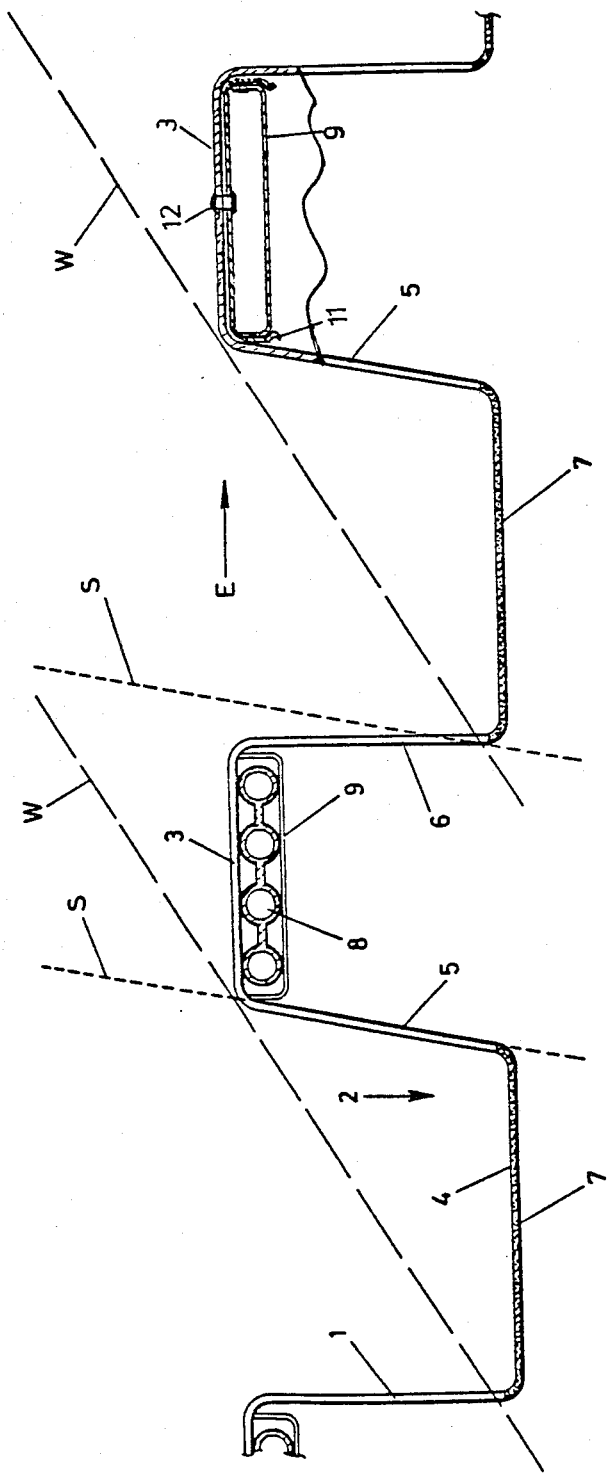
FIG. 1 shows one form of the invention in part cross-section.

In a preferred form of the invention the roofing material 1 can be formed of a suitable sheet material such as one of the known plastics sheets, fibreglass or the like and is of generally angular corrugated configuration of a series of troughs 2 joined at their upper portions by cross-portions 3.

Ideally the top 3 and bottom portions 4 are each planar either being horizontal or inclined to the horizontal, these being connected by planar side walls 5, 6 and can be formed of a transparent or translucent material with the planar top and bottom portions aluminised 7 to thus prevent the transmission of heat and light through these areas.

Each trough portion may not be symmetrical, the side wall 6 facing the equator preferably being vertical or near vertical such that it would be within the bounds of normal plus 45 degrees to the sun's rays at the winter solstice but may be at a slight angle thereto. The other side wall 5 can be vertical but is preferably inclined at a small angle to the vertical equal to or near to the sun's maximum altitude at the summer solstice −79.5 degrees (for latitude Sydney).

Thus at the winter solstice W virtually all the sun's rays hitting the side wall 6 facing the equator would be transmitted into the interior of the building.

At the summer solstice a small amount of the sun's radiation is transmitted through wall 5 when the sun is south of the east-west line—before 0830 hours and after 1530 hours solar time. At noon solar time about 45 percent of the direct radiation passes through wall 6 and just a small amount through wall 5 depending on how much the angle of wall 5 is less than 79.5 degrees from north.

In a preferred form of the invention as shown in FIG. 1 the tubes may be mounted in a box-like fitting 9 beneath the upper portion 3, this portion being clear and not aluminised. The box like fitting 9 can be metal or other material and can be of insulating material. Also the internal surface can be reflective so that the heat is reflected back onto the tubes. This then forms a hot box for the heating of the tubes, the heat being trapped in the box.

As shown in the right hand portion of FIG. 1, the box-like fitting 9 is a U shaped metal member held in position by clips 11 spaced across the upper portion 3. The clips 11 are attached by rivets 12 to the upper portion 3. The clips are attached and the box like fittings 9 clipped into position and when the roofing material is fitted to the roof the tubes are then slipped into position.

In an alternative form of the invention solar collecting tubes 8 can be mounted on the top of each of the planar upper portions so that the roof is a light controlling plus heat collecting roof.

Figure 2:
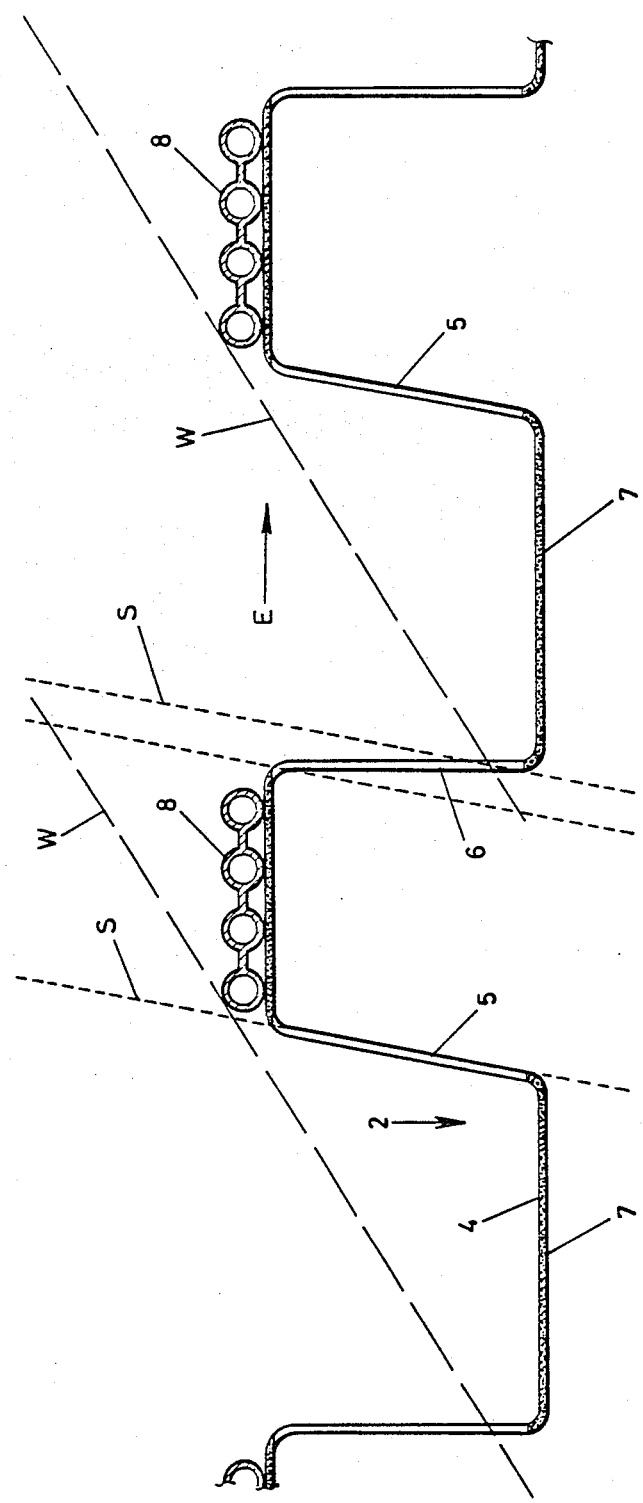
FIG. 2 shows a second form of the invention.

As shown in FIG. 2 these tubes can be mounted on the top of the upper portions 3 for direct contact by the sun's rays. The upper portion 3 may or may not be aluminised under the collecting tubes.

Figure 3:
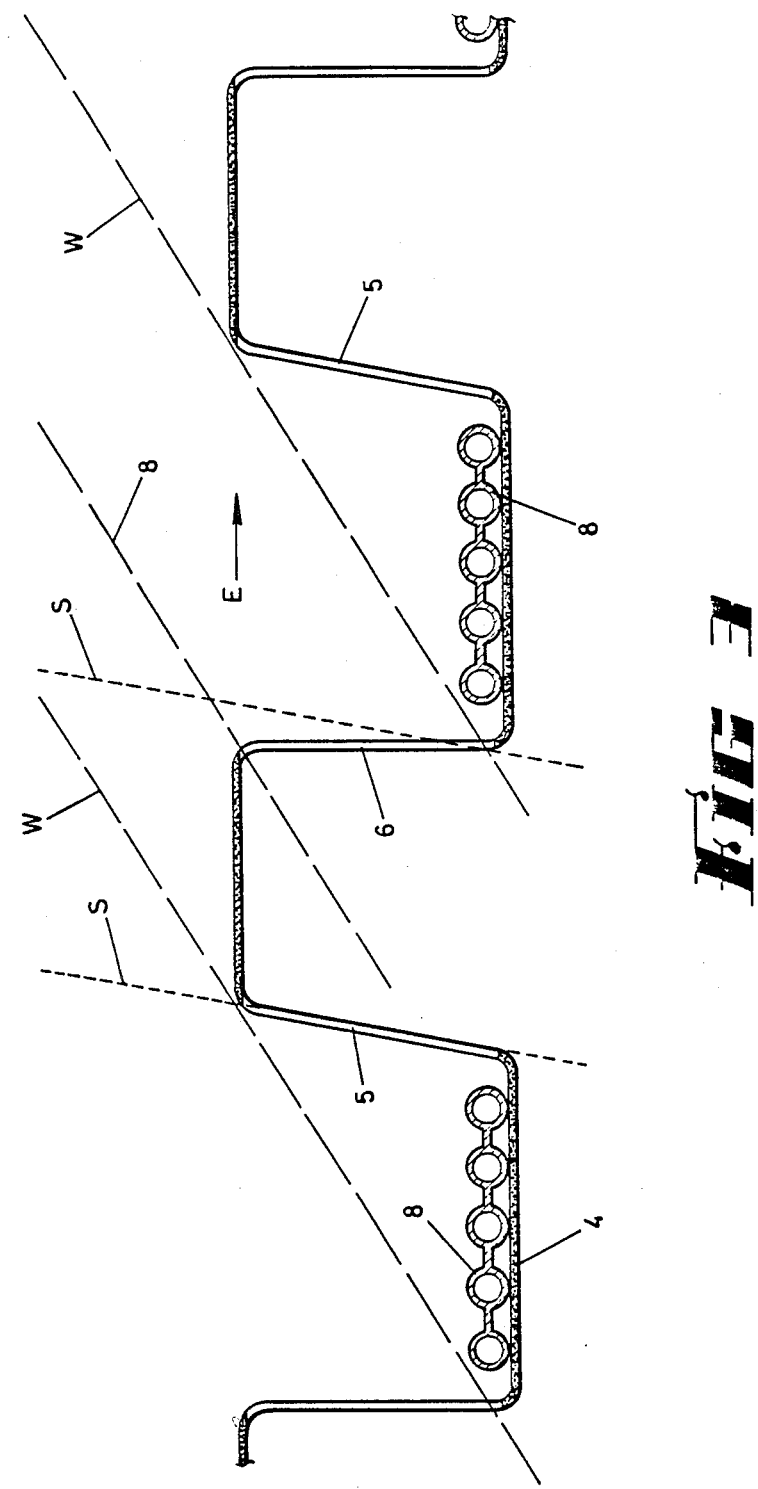
FIG. 3 shows a third form of the invention.

In FIG. 3 the tubes 8 are mounted on the bottom 4 of the troughs. In this position they can be used to collect heat between the spring and autumn equinoxes and for insulation and cooling when required.

Figure 4:
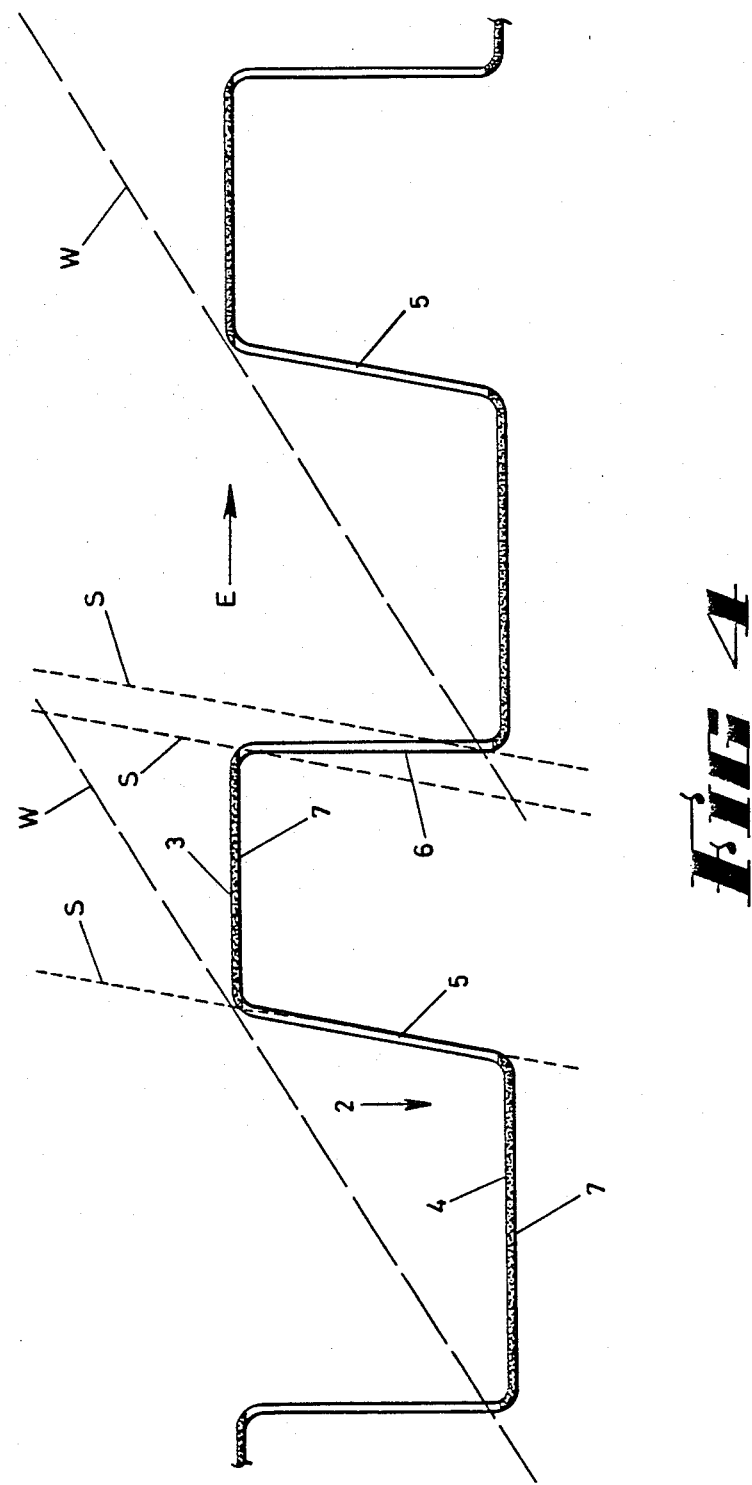
FIG. 4 shows the invention without heating tubes.
Figure 5:
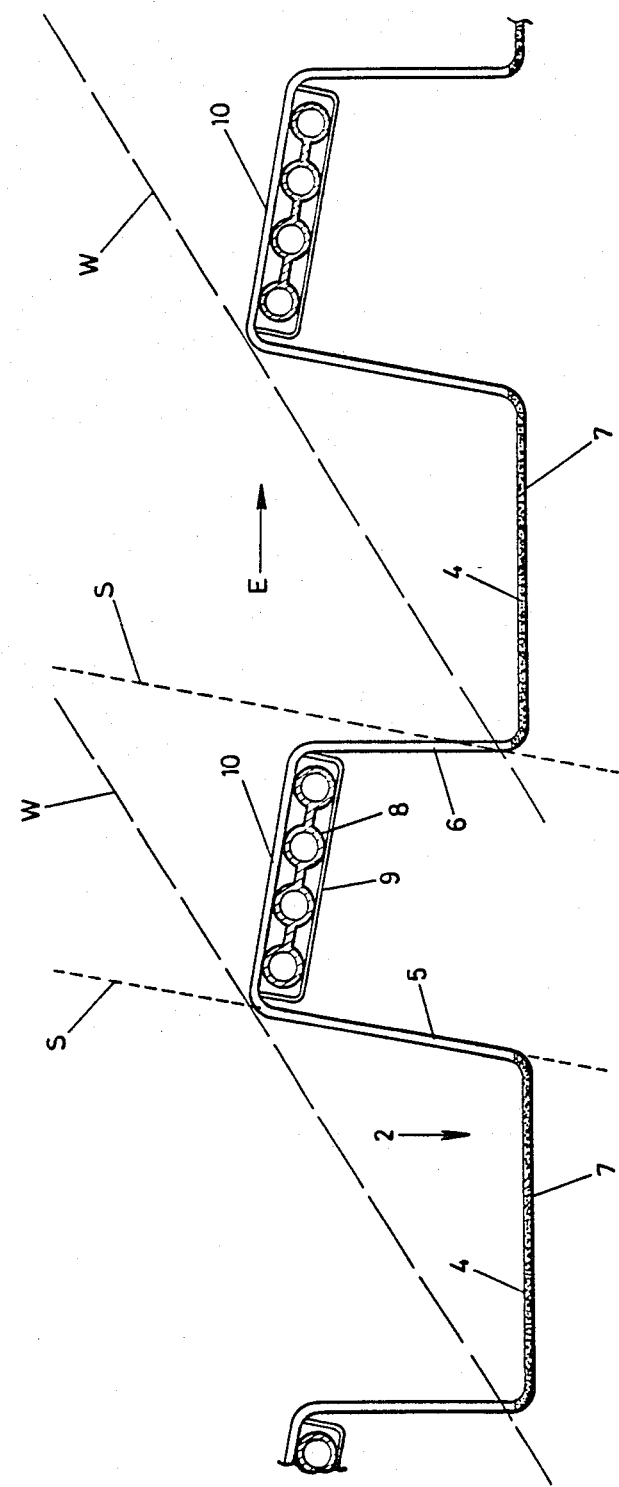
FIG. 5 shows a still further form of the invention.

FIG. 4 shows the form of the roofing material without heating tubes, while FIG. 5 shows a further embodiment with a top surface 3, instead of being generally horizontal, is inclined to face the equator. Thus the inclined surface 10 joins onto the inclined surfaces 5 and 6, the surface 6 being of shorter height.

Heating tubes 8 are mounted beneath the surface 10 (or above—not shown) and in this way a greater heat collecting facility is achieved during the winter months, while still allowing a greater degree of heat penetration into the building compared with the summer solstice.

Thus the roof combines the collection of the sun's heat and automatically controls the transmission of the sun's varying direct light and heat throughout the year. The roof in FIG. 1 will admit 60 percent of the sun's direct radiation at the winter solstice and without manipulation, the same roof will create increasing shade toward the mid summer reaching maximum shade at the solstice when the radiation at ground level is the most intense for the year. This will thus provide about 95 percent shade at noon solar time at the summer solstice.

Throughout the whole year light transmission is increased by "borrowed" light transmitted through the clear portions of the roof not exposed to direct radiation. This is of greatest benefit to those times of daylight hours when, through cloud cover, there is none or little direct solar radiation.

In the summer, direct sunlight and heat is transmitted in reduced proportions through the south facing clear portions of the roof during early morning and late evening when the sun is south of the east-west line. Radiation is transmitted through the north facing clear portions of the roof at other times of daylight hours.

The roof described admits a relatively constant solar radiation throughout the year. About 60 percent of the sun's radiation is admitted during the winter, and 5 or 20 percent during the summer, and this can be achieved either by fixing the vertical clear portions of the roof profile to face north or south, by tilting the roof down to either the north or the south, or by facing the clear portions away from true north. Also about 40 percent of the sun's radiation to fall on the roof is collected by the heating tubes in winter, and up to 90 percent is possible in mid summer.

The roof as illustrated is designed to suit the latitude of Sydney, Australia (minus 34 degrees) where the sun's maximum altitude at winter solstice is $32\frac{1}{2}$ degrees, and at the summer solstice $79\frac{1}{2}$ degrees.

However it is to be realised that the invention is not to be limited to the profile for this latitude.

The same profile is suitable for a big range of latitudes particularly if the roof is pitched according to the latitude. At 28 degrees latitude (Brisbane, Australia), the roof will achieve the same percentages if pitched down to the south by 6 degrees, and at Hobat, latitude 43 degrees, down to the north by 9 degrees. However other profiles according to the invention may be used to eliminate the pitching of the roof.

The transmission/collection ratio of 60:40 is chosen for the roof described as 60 percent transmission of light in mid winter is approximately equal to the solar radiation transmission of a typical glass house roof.

Other percentage transmission/collection ratios can be achieved by altering the pitch of the collection area from horizontal. For example if the collection area of the roofing profile is tilted down toward the equator as in FIG. 5 the collection percentage is increased and the collection tubes will be more directly exposed to the winter direct solar radiation, but this will be at the expense of the percentage radiation transmission to the building. The converse is also true.

If the unit is used for a swimming pool enclosure, the solar collecting tubes are connected to header pipes from the east and/or west ends of the roof which are in turn connected into the filter pump line. The pool water is used for heat storage. For glass houses to grow plants and for other buildings, similar and/or other suitable water reticulation and heat storage systems are envisaged.

Thus it will be seen that according to the invention there is provided automatic control of the transmission of the sun's light and heat to be at a maximum when the daily radiation at ground level is a minimum for the year, and to be at a minimum when the daily radiation for the year is at a maximum.

The sheet is thus versatile. If the sheet is inverted, the sheet at the winter solstice transmits 30 percent, collects 60 percent, and at the summer solstice transmits 5 percent and collects up to 90 percent. Also the sheet can be reversed north to south to vary the transmission and collection ratios, both in the normal and inverted positions. The solar collecting tubes can be used in reverse to cool the building by pumping cooled water through the system when required.

The aluminised portions of the roof totalling $87\frac{1}{2}$ percent of the horizontal area and the solar collecting pans or tubes re-radiate heat within the building at night time thus insulating the roof. Also other materials either of metal or of other heat and light reflecting materials, can be incorporated on the roofing material as a coating, or incorporated within the roofing material to form the opaque portions.

The roof and the solar system will modify the climate within the buildings at mid latitudes to be more akin to the relatively constant light and heat of the tropics.

Also if desired during extreme summer conditions, cold water can be pumped through the tubes thus reducing heat going into the area beneath.

The present invention has distinct advantages over Pat. No. 511075 and U.S. Pat. No. 4,143,492 by having two transparent generally vertical portions, one facing north, the other facing south, thus giving better light on cloudy days and better control in summer.

I claim:

1. A light controlling solar roof in which the surface of the roof is formed of a sheeting material being of an angular configuration to form a plurality of troughs which are formed by a generally planar upper wall and a generally planar lower wall having means associated therewith to prevent the passage of the sun's rays therethrough, each trough having side walls joining the upper and lower walls, each of the side walls being transparent or translucent, the side walls of each trough being vertical or near vertical so that in plan view little or none of the area is translucent or transparent whereby with troughs positioned in an east-west orientation the sun's rays at the winter solstice strike substantially the whole surface of the side walls at a large angle of incidence and are transmitted directly into the area beneath said side walls, with lesser amounts of the sun's radiation passing through the side walls at the summer solstice due to the sun's rays being at a lesser angle of incidence to the surface of said side walls, with both side walls allowing light to pass therethrough so that light passes therethrough on cloudy days.

2. A light controlling solar roof as in claim 1 wherein both the side walls are inclined to the vertical to form each trough having a greater opening width than the width of the lower wall the inclined wall facing the equator having a greater angle from the horizontal than the opposite inclined wall facing away from the equator, whereby up to 60 percent of the sun's radiation passes through the inclined wall facing the equator at the winter solstice, and a much lower percentage of the sun's radiation passes through both inclined walls at the summer solstice.

3. A light controlling solar roof as in claim 1 wherein the means to prevent passage of the sun's rays through said upper and lower walls comprises a metallic coating.

4. A light controlling solar roof as in claim 1 wherein the means to prevent passage of the sun's rays through said upper and lower walls comprises heat and light reflecting material incorporated within the sheeting material.

5. A light controlling solar roof as in claim 1 wherein the means to prevent passage of the sun's rays comprises a bank of tubes to be heated by the sun's rays.

6. A light controlling solar roof as in claim 5 wherein the bank of tubes is mounted on the outer face of the respective wall.

7. A light controlling solar roof as in claim 5 wherein the bank of tubes is mounted in a box beneath the respective wall.

8. A light controlling solar roof as in claim 1 wherein, with the troughs positioned in an east-west direction, said upper is inclined to face the equator.

9. A light controlling solar roof as in claim 8 wherein a bank of heating tubes is mounted above said inclined upper wall.

10. A light controlling solar roof as in claim 8 wherein a bank of heating tubes is mounted below said inclined upper wall.

* * * * *